United States Patent
Tabata (10) Patent No.: US 11,603,088 B2
(45) Date of Patent: Mar. 14, 2023

(54) CONTROL SYSTEM FOR HYBRID VEHICLE

(71) Applicant: TOYOTA JIDOSHA KABUSHIKI KAISHA, Toyota (JP)

(72) Inventor: Masakazu Tabata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 17/155,196

(22) Filed: Jan. 22, 2021

(65) Prior Publication Data

US 2021/0237713 A1    Aug. 5, 2021

(30) Foreign Application Priority Data

Jan. 31, 2020  (JP) .............................. JP2020-014641

(51) Int. Cl.
   *B60W 20/19*   (2016.01)
   *B60W 10/08*   (2006.01)
   *B60W 10/06*   (2006.01)

(52) U.S. Cl.
   CPC ............ *B60W 20/19* (2016.01); *B60W 10/06* (2013.01); *B60W 10/08* (2013.01); *B60W 2510/0633* (2013.01); *B60W 2510/0657* (2013.01); *B60W 2710/083* (2013.01)

(58) Field of Classification Search
   CPC ....... B60K 6/445; B60W 10/04; B60W 10/06; B60W 10/08; B60W 20/10; B60W 20/17; B60W 20/19; B60W 2510/0633; B60W 2510/0657; B60W 2540/10; B60W 2710/0666; B60W 2710/083; Y02T 10/62; Y02T 10/72
   See application file for complete search history.

(56) References Cited

U.S. PATENT DOCUMENTS

| | | | |
|---|---|---|---|
| 2018/0072301 A1 | 3/2018 | Itagaki | |
| 2018/0312050 A1* | 11/2018 | Endo | ..................... B60W 10/08 |
| 2020/0231136 A1* | 7/2020 | Johri | ................... F16H 61/0213 |

FOREIGN PATENT DOCUMENTS

JP         2018-043528 A      3/2018

* cited by examiner

*Primary Examiner* — Grant Moubry
*Assistant Examiner* — Ruben Picon-Feliciano
(74) *Attorney, Agent, or Firm* — Oliff PLC (57) ABSTRACT

A control system for a hybrid vehicle configured to reduce electricity consumption by a motor in a condition where a maximum output torque of an engine is restricted. A controller is configured to: calculate a current maximum torque of the engine when increasing a speed of the engine to achieve an acceleration demand; determine whether the current maximum torque of the engine is less than an inertia torque required to increase the speed of the engine; and adjust the reaction torque of the first motor to a value less than a predetermined value, if the current maximum torque of the engine is less than the inertia torque required to increase the speed of the engine.

9 Claims, 6 Drawing Sheets

CONTROL SYSTEM FOR HYBRID VEHICLE

CROSS REFERENCE TO RELATED APPLICATIONS

The present application claims the benefit of priority to Japanese Patent Application No. 2020-014641 filed on Jan. 31, 2020 with the Japanese Patent Office.

BACKGROUND

Field of the Disclosure

Embodiments of the present disclosure relate to the art of a control system for a hybrid vehicle in which a prime mover includes an engine and a motor-generator.

Discussion of the Related Art

JP-A-2018-043528 describes one example of a control system for a hybrid vehicle in which a prime mover includes an engine and motors. In the hybrid vehicle described in JP-A-2018-043528, a single-pinion planetary gear unit is adopted as a power split device. In the power split device, a carrier is connected to the engine, the sun gear is connected to the motor, and a ring gear is connected to an output member to which torque of a second motor is delivered.

According to teachings of JP-A-2018-043528, during propulsion in hybrid mode in which the vehicle is powered by the engine and the motors, a speed of the engine is controlled by torque of a first motor. In this situation, specifically, the first motor generates a reaction torque (i.e., a negative torque) in a counter direction to the torque of the engine, that is, the first motor serves as a reaction member. In the hybrid mode, torque and speed of the engine are increased in response to a demand to accelerate the vehicle. In this case, the first motor generates a negative torque to suppress an increase in the speed of the engine such that the speed of the engine is adjusted to an optimally fuel efficient point. A magnitude of the negative torque is governed by a gear ratio of the power split device, and the torque of the engine is increased by the negative torque.

In recent years, a hybrid vehicle in which a motor serves as a main prime mover becomes more popular. In the hybrid vehicle of this kind, a maximum output power of the motor is greater than a maximum output power of an engine, and an output torque of the engine may be restricted during e.g., lean-burn operation of the engine. If the output torque of the engine is restricted, the engine may not generate a torque required by a driver, however, a speed of the engine is increased by the first motor to fulfil an acceleration demand in spite of the fact that the torque of the engine is restricted. In this situation, the torque of the first motor is partially consumed to raise the speed of the engine, and hence a drive torque to propel the vehicle will be reduced. That is, the part of the torque of the first motor may not serve as the drive torque and wasted to increase the speed of the engine. Consequently, electricity consumption by the motor will be increased.

SUMMARY

Aspects of the present disclosure have been conceived noting the foregoing technical problems, and it is therefore an object of the present disclosure to provide a control system for a hybrid vehicle configured to reduce electricity consumption by the motor in a condition where a maximum possible output torque of the engine is smaller than a predetermined value.

The control system according to the embodiment of the present disclosure is applied to a hybrid vehicle comprising: an engine; an output member that transmits torque to drive wheels; a first motor having a generating function; and a power split mechanism that distributes output torque of the engine to the output member and the first motor. In the hybrid vehicle, the power split mechanism comprises an input element connected to the engine, a reaction element connected the first motor, and an output element connected to the output member. The first motor generates a reaction torque against the output torque of the engine generated based on a required engine torque when accelerating the vehicle, so as to deliver the output torque of the engine to the drive wheels. In order to achieve the above-explained objective, the control system is provided with a controller that controls the hybrid vehicle. Specifically, the controller is configured to: calculate a current maximum torque of the engine when increasing a speed of the engine to achieve an acceleration demand; determine whether the current maximum torque of the engine is less than an inertia torque required to increase the speed of the engine; and adjust the reaction torque of the first motor to a value equal to or less than a predetermined value, if the current maximum torque of the engine is less than the inertia torque required to increase the speed of the engine.

In a non-limiting embodiment, controller may be further configured to update the output torque of the engine to the current maximum torque, and correct the inertia torque of the engine to a value possible to be generated by the current maximum torque of the engine, if the current maximum torque of the engine is less than the inertia torque required to increase the speed of the engine.

In a non-limiting embodiment, the controller may be further configured to update the output torque of the engine to the current maximum torque, and adjust a change rate of the speed of the engine to a rate possible to be achieved by generating the current maximum torque of the engine, if the current maximum torque of the engine is less than the inertia torque required to increase the speed of the engine.

In a non-limiting embodiment, the controller may be further configured to adjust the reaction torque of the first motor to substantially zero, if the current maximum torque of the engine is less than the inertia torque required to increase the speed of the engine.

In a non-limiting embodiment, the controller may be further configured to equalize the inertia torque of the engine to the current maximum torque of the engine if the current maximum torque of the engine is less than the inertia torque required to increase the speed of the engine.

In a non-limiting embodiment, an operating mode of the engine may be selected from: a stoichiometric mode in which an air/fuel ratio is set to a theoretical air/fuel ratio; and a lean burn mode in which a ratio of the fuel to air is decreased compared to the stoichiometric mode. The controller may be further configured to: calculate the current maximum torque of the engine in each of the stoichiometric mode and the lean burn mode; and restrict the torque of the engine to the current maximum torque in the lean burn mode, if the operating mode of the engine is shifted from the lean burn mode to the stoichiometric mode.

In a non-limiting embodiment, the engine may include a supercharger, and the controller may be further configured to calculate the current maximum torque of the engine of a case in which a speed of a turbine of the supercharger is slower than a predetermined level.

In a non-limiting embodiment, the hybrid vehicle may further comprise a second motor that is disposed between the drive wheels and the output member, and the controller may be further configured to generate a shortfall of the torque which cannot be generated by the engine by the second motor when increasing the speed of the engine to achieve the acceleration demand.

In a non-limiting embodiment, a maximum output torque of the first motor may be greater than the maximum torque of the engine converted from a torque generated by the first motor.

Thus, according to the exemplary embodiment of the present disclosure, the controller calculates the current maximum torque of the engine when increasing a speed of the engine to achieve an acceleration demand, and determines whether the current maximum torque of the engine is less than the inertia torque required to increase the speed of the engine. In a case that the current maximum torque of the engine is less than the inertia torque required to increase the speed of the engine, the controller adjusts the reaction torque of the first motor to a value less than the predetermined value. That is, if the output torque of the engine is restricted for some reason, (or if a capacity of the engine is small), the first motor will not generate the reaction torque uselessly to increase the speed of engine higher than the level at which the output toque of the engine is no longer increased. According to the exemplary embodiment of the present disclosure, therefore, electric power will not be consumed wastefully by the first motor to increase the speed of the engine uselessly.

In addition, the current maximum torque of the engine is calculated in each of the stoichiometric mode and the lean burn mode, and the torque of the engine is restricted to the current maximum torque in the lean burn mode, if the operating mode of the engine is shifted from the lean burn mode to the stoichiometric mode. According to the exemplary embodiment of the present disclosure, therefore, torque and speed of the engine will not be raised abruptly even if the operating mode of the engine is shifted from the lean burn mode to the stoichiometric mode while reducing undesirable power consumption by the first motor. That is, noises and vibrations of the vehicle can be suppressed when the operating mode of the engine is shifted from the lean burn mode to the stoichiometric mode. For this reason, ride comfort of the vehicle can be ensured.

Further, when the reaction torque of the first motor is adjusted less than the predetermined value, the shortfall of the drive torque is generated by the second motor instead of the engine. According to the exemplary embodiment of the present disclosure, therefore, it is possible to prevent undesirable power consumption of the first motor while achieving the required drive force to accelerate the vehicle.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE EMBODIMENT(S)

Figure 1:
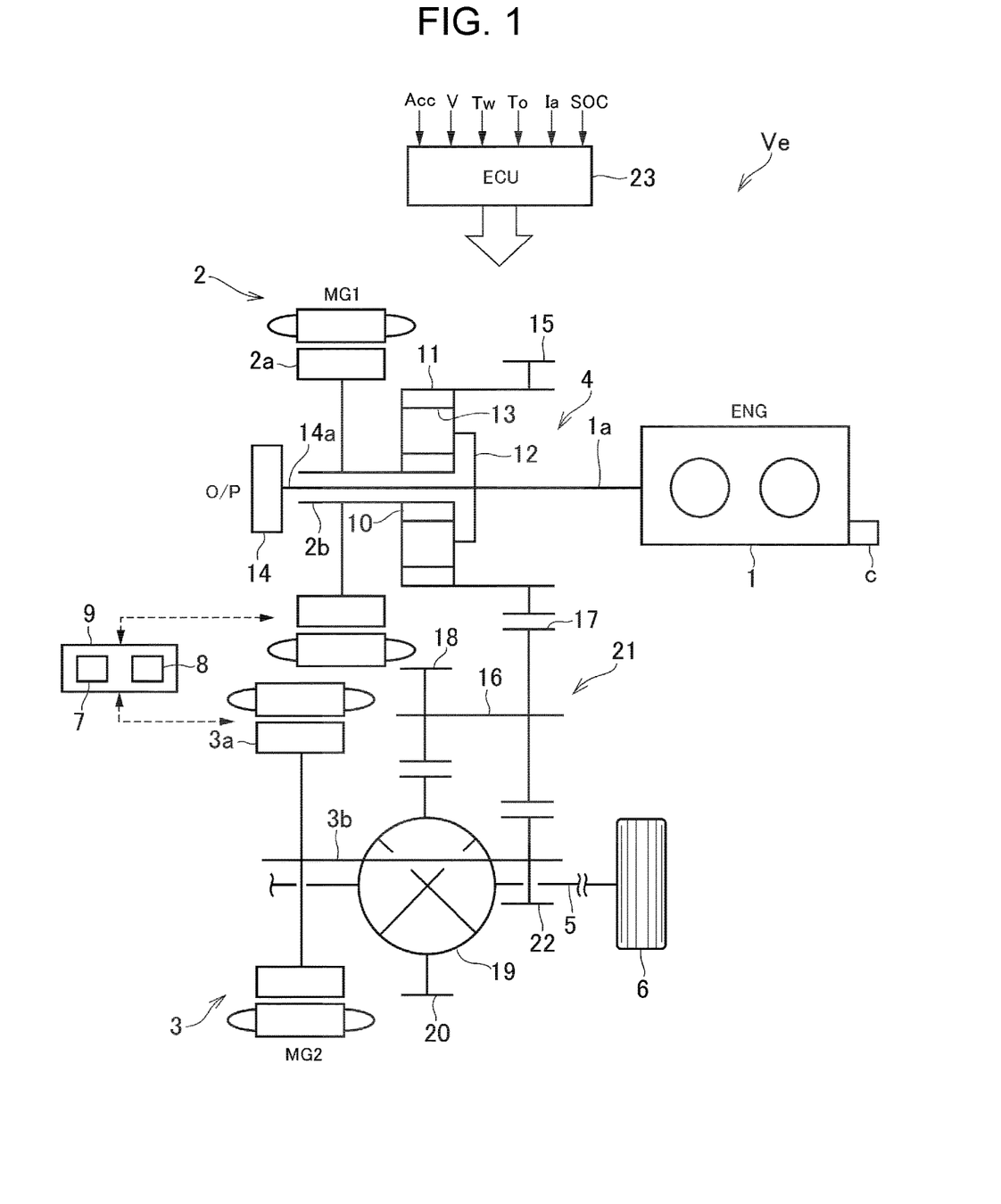
FIG. 1 is a schematic illustration showing one example of a powertrain of a hybrid vehicle to which the control system according to the exemplary embodiment of the present disclosure is applied.

Exemplary embodiment of the present disclosure will now be explained with reference to the accompanying drawings. Referring now to FIG. 1, there is shown one example of a powertrain of a hybrid vehicle (as will be simply called the "vehicle" hereinafter) Ve to which the control system according to the exemplary embodiment of the present disclosure is applied. A prime mover of the vehicle Ve comprises an engine (referred to as ENG in FIG. 1) 1, a first motor (referred to as MG1 in FIG. 1) 2, and a second motor (referred to as MG2 in FIG. 1) 3. In the vehicle Ve, an output power of the engine 1 is distributed to the first motor 2 and drive shafts 5 through a power split mechanism 4. An electric power generated by the first motor 2 may be supplied to the second motor 3 to generate torque, and a drive force generated by the second motor 3 may be delivered to the drive wheels 6.

For example, a gasoline engine and a diesel engine may be adopted as the engine 1, and an output torque of the engine 1 is changed by controlling an intake air, a fuel injection, and an ignition timing. According to the example shown in FIG. 1, the engine 1 is provided with a supercharger C that is driven by an exhaust gas emitted from the engine 1 to increase an air intake. That is, an output torque of the engine 1 can be increased by actuating the supercharger C.

For example, an operating mode of the engine 1 may be selected from: a stoichiometric mode in which an air/fuel ratio is set to a theoretical air/fuel ratio; and a lean burn mode in which a ratio of the fuel to air is decreased compared to the stoichiometric mode. The operating mode of the engine 1 may be selected based on a position of an accelerator pedal (not shown), a temperature of coolant water of the engine 1, an external temperature, a temperature of a catalyst (not shown) and so on. Specifically, the lean burn mode is selected to reduce a fuel consumption.

Each of the first motor 2 and the second motor 3 is a motor-generator that is operated not only as a motor to generate torque by applying electric power thereto, but also as a generator to generate electric power by applying torque thereto. For example, a permanent magnet synchronous motor and an induction motor may be adopted as the first motor 2 and the second motor 3, respectively. The first motor 2 and the second motor 3 are connected individually to a power source 9 including an electric storage device 7 having a battery and a capacitor and an inverter 8 so that electric power may be supplied to the first motor 2 and the second motor 3 from the power source 9. The electric storage device 7 may be charged with electric powers generated by the first motor 2 and the second motor 3.

The power split mechanism 4 as a differential mechanism is disposed between the engine 1 and the first motor 2. According to the exemplary embodiment of the present disclosure, a single-pinion planetary gear unit is adopted as the power split mechanism 4 to transmit torque between: the engine 1 and the first motor 2; and the drive wheels 6. The power split mechanism 4 comprises: a sun gear 10 as a reaction element; a ring gear 11 as an output element arranged concentrically with the sun gear 10; a plurality of pinion gears 13 interposed between the sun gear 10 and the ring gear 11; and a carrier 12 as an input element supporting the pinion gears 13 in a rotatable and revolvable manner.

The power split mechanism 4 is arranged coaxially with the engine 1 and the first motor 2. Specifically, an output shaft 1a of the engine 1 is connected to the carrier 12 of the power split mechanism 4 so that the output shaft 1a serves as an input shaft of the power split mechanism 4. In order to cool and lubricate the power split mechanism 4, and to reduce fevers of the first motor 2 and the second motor 3 derived from e.g., an iron loss, an oil pump 14 is arranged on an opposite side of the engine 1 across the power split mechanism 4. Specifically, the carrier 12 of the power split mechanism 4 is also connected to a rotary shaft 14a of the oil pump 14 so that the oil pump 14 is driven by the engine 1 to generate hydraulic pressure.

The first motor 2 is disposed between the oil pump 14 and the power split mechanism 4, and in the first motor 2, a hollow rotor shaft 2b that is rotated integrally with a rotor 2a is connected to a hollow rotary shaft of the sun gear 10 of the power split mechanism 4. The rotary shaft 14a of the oil pump 14 penetrates through the rotor shaft 2b and the sun gear 10 to be connected to the output shaft 1a of the engine 1.

A first drive gear 15 as an external gear is integrally formed around the ring gear 11 of the power split mechanism 4 to serve as an output member, and a countershaft 16 is arranged in parallel with a common rotational axis of the power split mechanism 4 and the first motor 2. A counter driven gear 17 diametrically larger than the first drive gear 15 is fitted onto one end of the countershaft 16 (i.e., right side in FIG. 1) to be rotated integrally therewith while being meshed with the first drive gear 15 so that torque transmitted from the first drive gear 15 is multiplied. A counter drive gear 18 is fitted onto the other end of the countershaft 16 (i.e., left side in FIG. 1) in such a manner as to be rotated integrally therewith while being meshed with a differential ring gear (or final driven gear) 20 of a deferential gear unit 19 as a final reduction. Thus, the ring gear 11 of the power split mechanism 4 is connected to the drive wheel 6 through the driveshafts 5 and an output gear train 21 including the first drive gear 15, the countershaft 16, the counter driven gear 17, the counter drive gear 18, and the differential ring gear 20.

In the powertrain of the vehicle Ve, an output torque of the second motor 3 can be added to the torque delivered from the power split mechanism 4 to the drive wheels 6 through the driveshafts 5. To this end, a rotor 3a of the second motor 3 is connected to a rotor shaft 3b extending in parallel to the countershaft 15 to rotate integrally therewith, and a second drive gear 22 is fitted onto a leading end of the rotor shaft 3b to be rotated integrally therewith while being meshed with the counter driven gear 17. Thus, the ring gear 11 of the power split mechanism 4 is connected to the second motor 3 through the differential ring gear 20 and the second drive gear 22. That is, the ring gear 11 and the second motor 3 are individually connected to the drive wheels 6 through the differential ring gear 20 and the driveshafts 5.

An operating mode of the vehicle Ve may be selected from a hybrid mode (to be abbreviated as the "HV mode" hereinafter) in which the vehicle Ve is powered by the engine 1 (and the second motor 3 according to need), and an electric vehicle mode (to be abbreviated as the "EV mode" hereinafter) in which the vehicle Ve is powered by the first motor 2 and the second motor 3 while supplying electric power to the motors 2 and 3 from the storage device 7. The operating mode of the vehicle Ve is selected by an electronic control unit (to be abbreviated as the "ECU" hereinafter) 23 as a controller that is electrically connected to the engine 1, the first motor 2 and the second motor 3. The ECU 23 comprises a microcomputer as its main component, and the ECU 24 is configured to carry out a calculation based on incident data and stored data such as maps, and transmit a calculation result in the form of command signal. For example, the ECU 23 receives data about a vehicle speed V, a position Acc of the accelerator pedal, a temperature TW of the engine water, an external temperature To, an air intake Ia, a state of charge level SOC of the storage device 7 and so on. Specifically, maps determining the operating mode, an optimum fuel efficiency curve of the engine 1, a maximum output torque of the engine 1, a required power to be generated by the engine 1 and so on are installed in the ECU 23. For example, the ECU 23 transmits command signals for starting and stopping the engine 1, torque command signals for operating the first motor 2 and the second motor 3 and so on. Optionally, a plurality of the ECUs may be arranged in the hybrid vehicle according to need.

In the HV mode, the output power of the engine 1 is delivered to the drive wheels 6 by connecting the engine 1 to the power split mechanism 4 while applying reaction torque of the first motor 2 to the power split mechanism 4. In this situation, in the power split mechanism 4, the sun gear 10 serves as the reaction element. That is, the first motor 2 generates reaction torque counteracting the output torque of engine 1 so as to deliver the output torque of the engine 1 generated in response to an acceleration demand to the drive wheels 6.

A rotational speed of the first motor 2 may be controlled arbitrarily in accordance with a value and a frequency of current applied thereto, and an engine speed Ne may be controlled by controlling the rotational speed of the first motor 2. To this end, specifically, required drive force is calculated based on a position Acc of the accelerator pedal and a vehicle speed V, and required engine power Pe_req is calculated based on the required drive force. Then, engine torque Te_req required by the driver (as will be called the "required engine torque Te_req" hereinafter) is calculated based on the required engine power Pe_req and a current engine speed Ne. Thereafter, an operating point of the engine 1 is determined on an optimum fuel efficiency curve based on the required engine torque Te_req and the current engine speed Ne. After thus determining the operating point of the engine 1, a rotational speed of the first motor 2 is controlled in such a manner as to operate the engine 1 at the determined operating point. Specifically, output torque Tmg1 or a rotational speed of the first motor 2 is controlled in accordance with the torque of the engine 1 delivered to the power split mechanism 4 so as to adjust the engine speed Ne to a target engine speed. Since the engine speed Ne is changed by changing the speed of the first motor 2, the engine speed Ne may be changed continuously.

Figure 2:
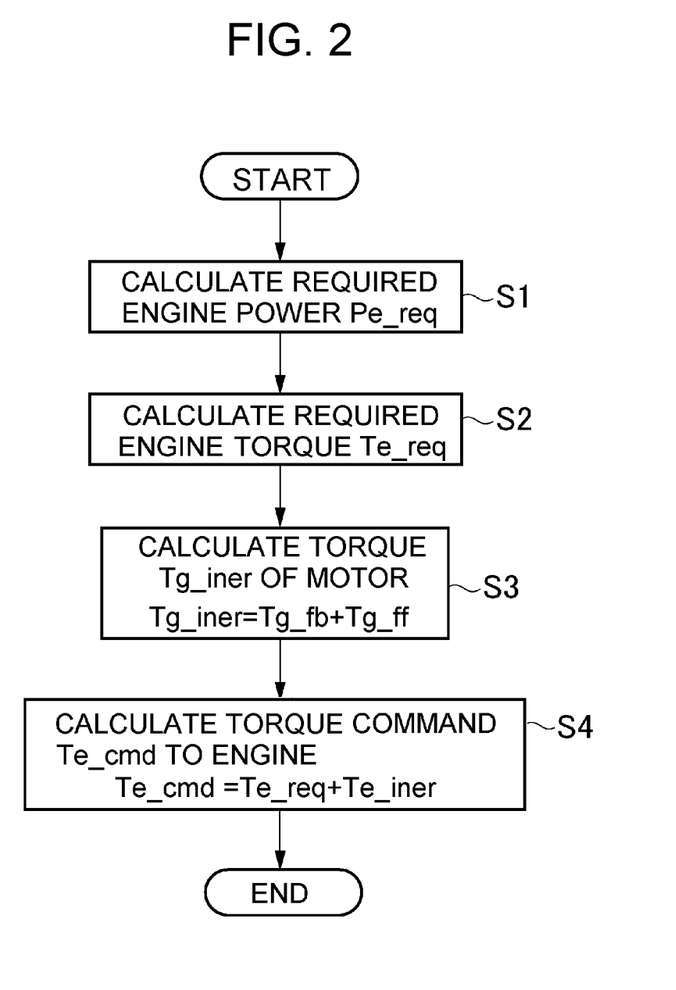
FIG. 2 is a flowchart showing one example of a routine for calculating a torque command to an engine.

Turning to FIG. 2, there is shown a routine to calculate a torque command Te_cmd transmitted to the engine 1 in accordance with an acceleration demand and a required drive force. Contents of the routine shown in FIG. 2 is explained in detail in JP-A-2018-043528, therefore, the following explanations for the routine shown in FIG. 2 will be simplified. At step S1, a required engine power Pe_req is calculated based on a required drive force. For example, the required drive force may be obtained with reference to a map for determining the required drive force based on a position Acc of the accelerator pedal and a vehicle speed V.

Then, at step S2, the required engine torque Te_req is calculated. Specifically, the required engine torque Te_req is a torque required by the driver to propel the vehicle Ve, and for example, the required engine torque Te_req is governed by a position Acc of the accelerator pedal. At step S2, therefore, the required engine torque Te_req may be calculated based on the required drive force and a current engine speed Ne.

Then, at step S3, a torque Tg_iner being generated by the first motor 2 to increase the engine speed Ne in response to the acceleration demand is obtained by a feedback and feedforward methods. At step S3, the feedback control is executed to obtain a feedback torque Tg_fb based on a difference between the current engine speed Ne and a target engine speed Ne_req in the current routine, and the feedforward control is executed to obtain a feedforward torque Tg_ff based on a difference between the target engine speed Ne_req in the current routine and a target engine speed Ne_req+1 in the next routine. Then, the torque Tg_iner of the first motor 2 is calculated based on the feedback torque Tg_fb and the feedforward torque Tg_ff as expressed by the following expression:

$$Tg\_iner = Tg\_fb + Tg\_ff \qquad (1).$$

Specifically, the feedforward torque Tg_ff is calculated using the following formula:

$$Tg\_ff = Ie \cdot K \cdot dNe/dt \qquad (2);$$

where "dNe" is an increased amount of the target engine speed Ne_req during execution of one routine, "Ie" is a total inertia moment of the engine 1 and the first motor 2, and "K" is a conversion coefficient to convert a shaft torque of the engine 1 into a shaft torque of the first motor 2.

Thereafter, at step S4, the torque command Te_cmd to the engine 1 is calculated by adding the inertia torque Te_iner of the engine 1 converted from the torque Tg_iner generated by the first motor 2 to the required engine torque Te_req, as expressed by the following expression:

$$Te\_cmd = Te\_req + Te\_iner \qquad (3).$$

In this situation, the first motor 2 generates only the reaction torque against the required engine torque Te_req. In the normal situation, the engine speed Ne is controlled by the first motor 2. For example, when increasing the engine speed Ne in response to an acceleration demand, a rotational speed of the first motor 2 is increased in the same direction as a rotational direction of the engine 1. An increased amount in the forward torque of the first motor 2 of this case corresponds to an inertia torque required to increase the engine speed Ne. That is, the torque of the first motor 2 is increased in the forward direction to raise the engine speed Ne, and consequently the reaction force against the required engine torque Te_req serving as a drive force to propel the vehicle Ve is reduced. In order to avoid such reduction in the drive force, as can be seen from the expression (3) for calculating the torque command Te_cmd to the engine 1 at step S4, the engine 1 generates the inertia torque Te_iner, and the first motor 2 generates only the reaction force against the required engine torque Te_req.

Next, here will be explained one example of procedures to control the reaction torque of the first motor 2 when the engine torque is restricted. When the driver accelerates the vehicle Ve, the torque command Te_cmd transmitted to the engine 1 is calculated by the above-explained procedures shown in FIG. 2. However, if the output torque of the engine 1 is restricted for some reason, the engine 1 may not generate the torque to achieve the torque command Te_cmd. For example, the engine 1 may not generate the torque to achieve the torque command Te_cmd if a temperature TW of the engine water is lower than a predetermined level, an external temperature To is lower than a predetermined level, or if the vehicle Ve is accelerated and hence the torque command Te_cmd is greater than the maximum output torque of the engine 1 achieved by increasing the engine speed Ne by the first motor. In those cases, although the first motor 2 generates a torque to increase the engine speed Ne to achieve the required acceleration, but the drive force to propel the vehicle Ve will not be increased by the torque of the first motor 2. That is, electric power is wasted by the first motor 2 only to increase the engine speed Ne. In order to prevent such undesirable electric power consumption by the first motor 2, the ECU 23 is further configured to execute the routine shown in FIG. 3.

Figure 3:
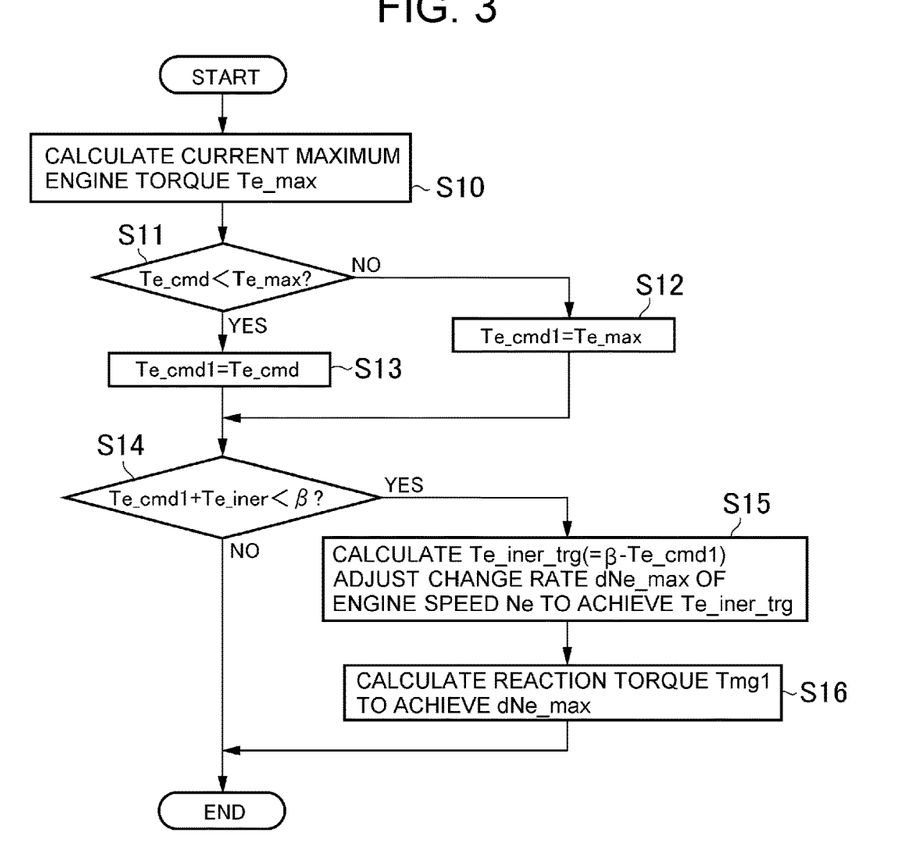
FIG. 3 is a flowchart showing one example of a routine for calculating a reaction torque of a first motor.
Figure 4:
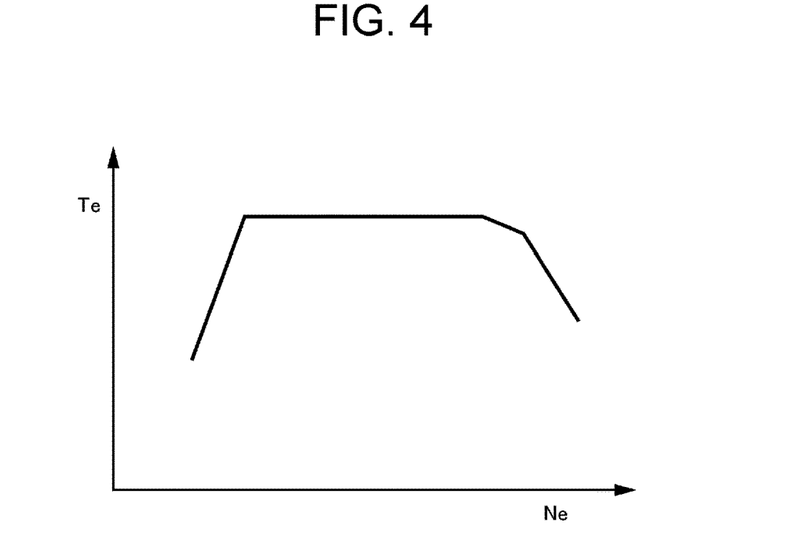
FIG. 4 is a map determining a current maximum torque of the engine in a stoichiometric mode.

According to the routine shown in FIG. 3, the reaction torque of the first motor 2 is controlled in accordance with a current maximum engine torque. For example, the routine shown in FIG. 3 is executed when launching the vehicle Ve. At step S10, a current maximum torque Te_max of the engine 1 in the stoichiometric mode is calculated. For example, the current maximum torque Te_max of the engine 1 in the stoichiometric mode may be obtained with reference to a map shown in FIG. 4. Specifically, the current maximum torque Te_max of the engine 1 is not an actual maximum torque of the engine 1 governed by a capacity of the engine 1, but a current theoretical maximum torque of the engine 1. As described, the maximum output torque of the engine 1 is governed by the temperature TW of the engine water, the external temperature To and so on.

Then, it is determined at step S11 whether the current maximum torque Te_max of the engine 1 calculated at step S10 is greater than the torque command Te_cmd calculated at step S4 of the routine shown in FIG. 2. That is, it is determined at step S11 whether the torque command Te_cmd can be achieved by the engine 1 in the current condition. If the torque command Te_cmd is greater than the current maximum torque Te_max of the engine 1 so that the answer of step S11 is NO, the routine progresses to step S12 to update the torque command Te_cmd to an updated torque command Te_cmd1 comparable to the current maximum torque Te_max. In other words, the torque command Te_cmd is corrected to the current maximum torque Te_max.

By contrast, if the current maximum torque Te_max of the engine 1 is greater than the torque command Te_cmd so that the answer of step S11 is YES, the routine progresses to step S13 to employ the torque command Te_cmd as the updated torque command Te_cmd1. In other words, the torque command Te_cmd calculated at step S4 of the routine shown in FIG. 2 is maintained.

Then, it is determined at step S14 whether a total value of the updated torque command Te_cmd1 and the inertia torque Te_iner of the engine 1 converted from the torque Tg_iner of the first motor 2 calculated at step S3 of the routine shown in FIG. 2 is less than a threshold value β set to zero or in the vicinity of zero. That is, it is determined at step S14 whether the inertia torque Te_iner of the engine 1 can be achieved by generating the torque by the engine 1 in the amount of the updated torque command Te_cmd1. In the case that the torque command Te_cmd is reduced to the updated torque command Te_cmd1 corresponding to the current maximum torque Te_max, an absolute value of a magnitude of the inertia torque Te_iner of the engine 1 is greater than the updated torque command Te_cmd1. In this case, therefore, the answer of step 14 will be YES. In other words, it is determined at step S14 whether the total value of the updated torque command Te_cmd1 and the inertia torque Te_iner of the engine 1 is a negative value, as expressed by the following inequality:

$$Te\_cmd1 + Te\_iner < \beta \qquad (4).$$

Still in other words, it is determined at step S14 whether the updated torque command Te_cmd1 is less than the absolute value of the inertia torque Te_iner, as expressed as Te_cmd1<Te_iner.

If the total value of the updated torque command Te_cmd1 and the inertia torque Te_iner is less than the threshold value ß so that the answer of step S14 is YES, the routine progresses to step S15 to set a target inertia torque Te_iner_trg of the engine 1 to a value at which the inertia torque Te_iner is equalized to the updated torque command Te_cmd1. As described, the routine shown in FIG. 3 is executed to reduce undesirable power consumption by the first motor 2 when the output torque of the engine 1 is restricted. To this end, the inertia torque Te_iner of the engine 1 required to increase the engine speed Ne is adjusted to the value possible to be generated by the engine 1. Specifically, at step S15, a change rate dNe_max of the engine speed Ne increased in response to the acceleration demand is adjusted to a rate possible to be achieved by generating the torque by the engine 1 in the amount of the updated torque command Te_cmd1. In other words, in order to prevent an increase in the engine speed Ne further than the speed at which the current maximum torque Te_max is generated, the inertia torque Te_iner of the engine 1 converted from the torque Tg_iner of the first motor 2 calculated at step S3 is corrected to a value possible to be generated by the updated torque command Te_cmd1 as a current maximum engine torque. As a result of thus reducing the inertia torque Te_iner of the engine 1, the drive torque to propel the vehicle Ve is reduced less than a required drive force by the driver. Therefore, a shortfall of the drive force with respect to the required drive is generated by the second motor 3.

Thereafter, a reaction torque T_mg1 of the first motor 2 possible to achieve the change rate dNe_max of the engine speed Ne adjusted at step S15 is calculated at step S16. Specifically, the reaction torque T_mg1 may be calculated by the following formula:

$$T\_mg1 = -\rho/(1+\rho) \cdot Te\_cmd1 + Tg\_iner\_trg \qquad (5);$$

where "$-\rho/(1+\rho) \cdot Te\_cmd1$" is the reaction torque generated by the first motor 2 to achieve the updated torque command Te_cmd1, and "$\rho$" is a gear ratio of the power split mechanism 4 between number of teeth of the sun gear 10 and number of teeth of the ring gear 11.

As described, the threshold value ß is set to zero or substantially zero, and the inertia torque Te_iner is equalized to the updated torque command Te_cmd1. That is, in this situation, the total value of the target inertia torque Te_iner_trg of the engine 1 and the updated torque command Te_cmd1 is zero or substantially zero. For this reason, when accelerating the vehicle Ve, the engine speed Ne is increased to the target speed in response to the updated torque command Te_cmd1 without generating the reaction torque by the first motor 2. After increasing the engine speed Ne to the target speed, the first motor 2 starts generating the reaction torque so that the drive force to propel the vehicle Ve is established by the torque of the engine 1. During the period in which the first motor 2 does not generate the reaction force, the second motor 3 generates torque to achieve the acceleration demand, and after start generating the reaction force by the first motor 2, the torque of the second motor 3 is reduced. By contrast, if the total value of the updated torque command Te_cmd1 and the inertia torque Te_iner is greater than the threshold value ß so that the answer of step S14 is NO, the routine returns.

Thus, according to the exemplary embodiment of the present disclosure, if the output torque of the engine 1 is restricted for some reason in the event of accelerating the vehicle Ve, the inertia torque Te_iner of the engine 1 to increase the engine speed Ne is reduced to the magnitude currently possible to be generated by the engine 1, and the reaction torque of the first motor 2 is reduced with such reduction in the inertia torque Te_iner. According to the exemplary embodiment of the present disclosure, therefore, the first motor 2 will not generate torque uselessly to increase the engine speed Ne higher than the level at which the output toque of the engine 1 is no longer increased. That is, the electric power will not be consumed wastefully by the first motor 2 to increase he engine speed Ne uselessly.

In the case that the output torque of the engine 1 is restricted for some reason, the engine 1 may not generate the torque to achieve the required acceleration, but the shortfall of the drive torque is generated by the second motor 3 instead of the engine 1. According to the exemplary embodiment of the present disclosure, therefore, it is possible to prevent undesirable power consumption of the first motor 2 while achieving the required drive force to accelerate the vehicle Ve.

Figure 5:
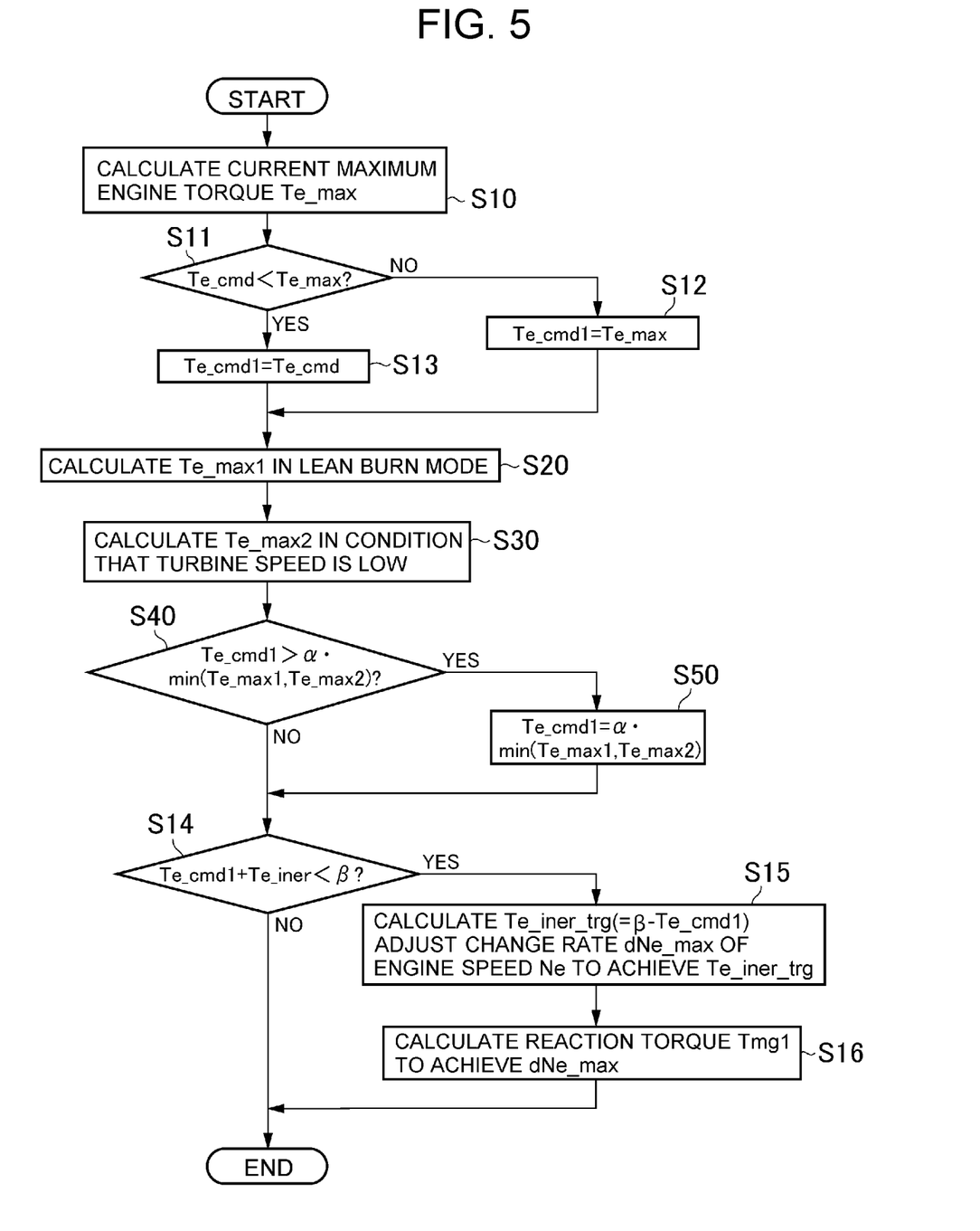
FIG. 5 is a flowchart showing another example of a routine for calculating the reaction torque of the first motor.

Turning to FIG. 5, there is shown another example of procedures to control the reaction torque of the first motor 2 when the engine torque is restricted in the lean burn mode. For example, the lean burn mode is selected when reducing fuel consumption of the engine 1, or a temperature of exhaust gas is still low and hence a rotational speed of a turbine of the supercharger C is low. In the lean burn mode, since a ratio of the fuel to air is decreased compared to the stoichiometric mode, the output torque of the engine 1 is also restricted. In the following description, explanations for the steps in common with those of the routine shown in FIG. 3 will be simplified.

As described, at step S10, a current maximum torque Te_max of the engine 1 in the stoichiometric mode is calculated. Then, it is determined at step S11 whether the current maximum torque Te_max of the engine 1 calculated at step S10 is greater than the torque command Te_cmd calculated at step S4 of the routine shown in FIG. 2. If the torque command Te_cmd is greater than the current maximum torque Te_max so that the answer of step S11 is NO, the routine progresses to step S12 to update the torque command Te_cmd to an updated torque command Te_cmd1 comparable to the current maximum torque Te_max. By contrast, if the current maximum torque Te_max of the engine 1 is greater than the torque command Te_cmd so that the answer of step S11 is YES, the routine progresses to step S13 to employ the torque command Te_cmd as the updated torque command Te_cmd1.

Figure 6:
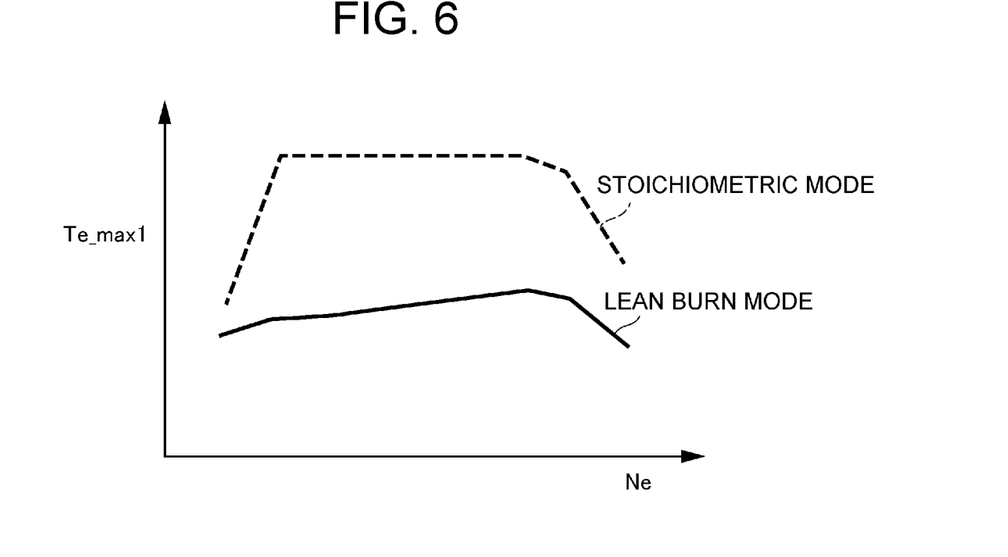
FIG. 6 is a map determining a maximum engine torque in a stoichiometric mode and a lean burn mode.
Figure 7:
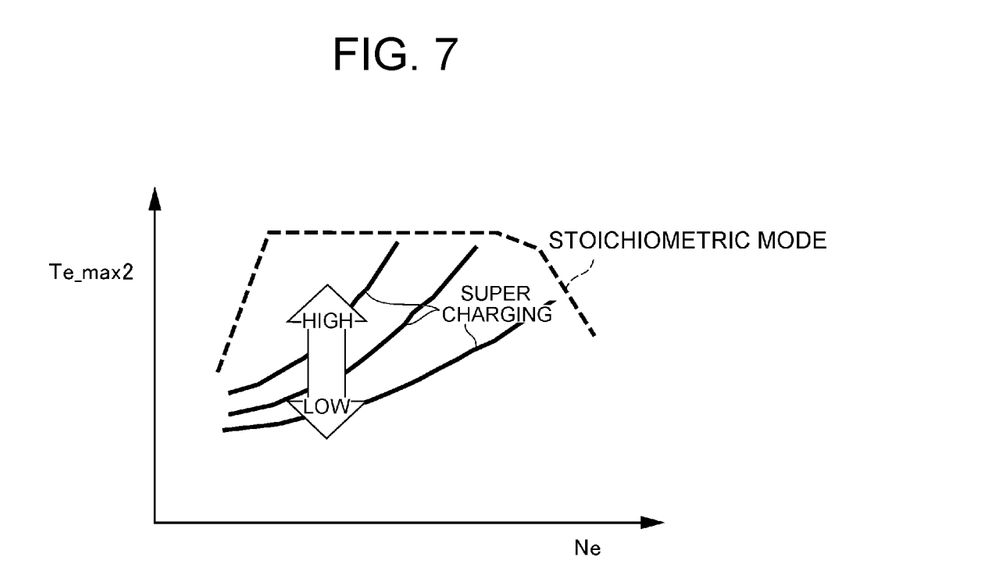
FIG. 7 is a map determining a maximum engine torque when a turbine speed is low.

Then, at step S20, a current maximum torque Te_max1 of the engine 1 in the lean burn mode is calculated with reference to a map shown in FIG. 6. In FIG. 6, the dashed curve indicates the current maximum torque Te_max1 in the stoichiometric mode, and the solid curve indicates the current maximum torque Te_max1 in the lean burn mode. As can be seen from FIG. 6, the current maximum torque Te_max1 of the engine 1 is lower in the lean burn mode compared to the stoichiometric mode. Then, at step S30, a current maximum torque Te_max2 of the engine 1 in the situation that the rotational speed of a turbine of the supercharger C is low with reference to a map shown in FIG. 7. As can be seen from FIG. 7, the current maximum torque Te_max2 of the engine 1 is restricted if the rotational speed of a turbine of the supercharger C is low. Here, steps S20 and S30 may be executed simultaneously, or an order to execute steps S20 and S30 may be switched.

Figure 8:
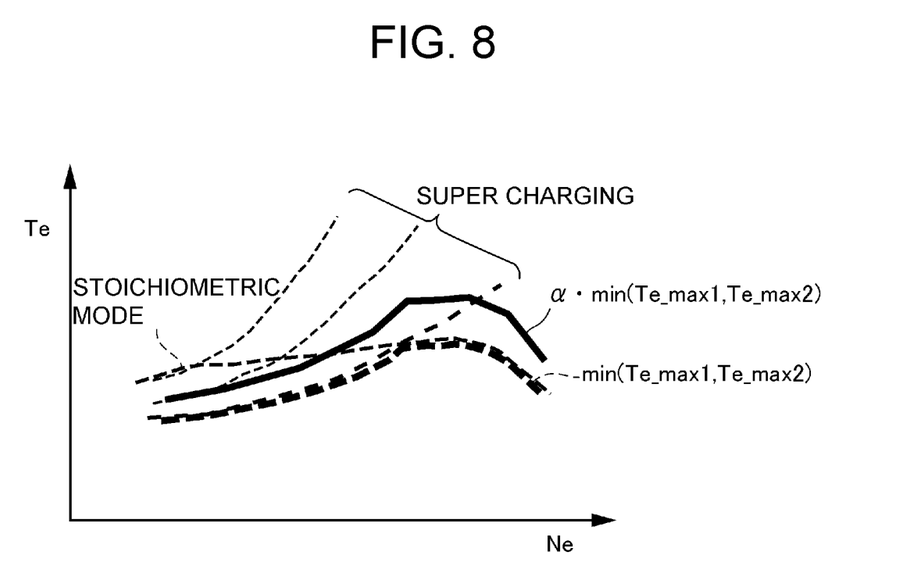
FIG. 8 is a map for updating a torque command during execution of the routine shown in FIG. 5.

Then, it is determined at step S40 whether the updated torque command Te_cmd1 calculated at step S12 or S13 is greater than a value calculated by multiplying the smaller one of the current maximum torque Te_max1 and the current maximum torque Te_max2 by a predetermined coefficient α. The updated torque command Te_cmd1 is set to the current maximum torque Te_max in the stoichiometric mode. If the current maximum torque Te_max1 or the current maximum torque Te_max2 is smaller than the updated torque command Te_cmd1, it is preferable to correct the updated torque command Te_cmd1 to the current maximum torque Te_max1 or the current maximum torque Te_max2. For this purpose, at step S40, the updated torque command Te_cmd1 is compared to the current maximum torque Te_max1 and the current maximum torque Te_max2. According to another example shown in FIG. 5, specifically, the coefficient α is set to slightly larger than 1. Turning to FIG. 8, there is shown one example of a map used to make such determination at step S40. In FIG. 8, the thick dashed curve represents a synthesized torque of the current maximum torque Te_max1 indicated by the solid curve in FIG. 6 and the current maximum torque Te_max2 indicated by the lowest solid curve in FIG. 7, and the thick solid curve indicates the calculated by multiplying the smaller one of the current maximum torque Te_max1 and the current maximum torque Te_max2 by the coefficient α.

If the updated torque command Te_cmd1 is greater than the value calculated by multiplying the smaller one of the current maximum torque Te_max1 and the current maximum torque Te_max2 by the coefficient α so that the answer of step S40 is YES, the routine progresses to step S50 to update the updated torque command Te_cmd1 to the value calculated by multiplying the smaller one of the current maximum torque Te_max1 and the current maximum torque Te_max2 by the coefficient α. Then, the routine progresses to step S14.

By contrast, if the updated torque command Te_cmd1 is smaller than the value calculated by multiplying the smaller one of the current maximum torque Te_max1 and the current maximum torque Te_max2 by the coefficient α so that the answer of step S40 is NO, the updated torque command Te_cmd1 is maintained and the routine progresses to step S14.

As described, at step S14, it is determined whether the total value of the updated torque command Te_cmd1 and the inertia torque Te_iner of the engine 1 is less than the threshold value ẞ. That is, it is determined at step S14 whether the inertia torque Te_iner of the engine 1 can be achieved by generating the torque by the engine 1 in the amount of the updated torque command Te_cmd1 restricted in the lean burn mode. In other words, it is determined at step S14 whether the updated torque command Te_cmd1 is less than the inertia torque Te_iner. In the case that the torque command Te_cmd is reduced, an absolute value of a magnitude of the inertia torque Te_iner of the engine 1 is greater than the updated torque command Te_cmd1. In this case, therefore, the answer of step 14 will be YES.

If the total value of the updated torque command Te_cmd1 and the inertia torque Te_iner is less than the threshold value ẞ so that the answer of step S14 is YES, the routine progresses to step S15 to set a target inertia torque Te_iner_trg of the engine 1 to a value at which the inertia torque Te_iner is equalized to the updated torque command Te_cmd1. In this situation, the engine 1 generates the maximum torque indicated by the thick solid curve in FIG. 8 thereby increasing the engine speed Ne. Thereafter, at step S16, the reaction torque T_mg1 is calculated by the above-explained formula (5). As described, in this situation, the total value of the target inertia torque Te_iner_trg of the engine 1 and the updated torque command Te_cmd1 is substantially zero. During the period in which the first motor 2 does not generate the reaction force, the second motor 3 generates torque to achieve the acceleration demand.

As described, the lean burn mode is selected to reduce fuel consumption. However, if the temperature TW of the engine water or the external temperature To is not high enough, the engine 1 may not be operated in the lean burn mode, and the operating mode of the engine 1 is shifted to the stoichiometric mode. As also described, an available output torque in the stoichiometric mode is larger than that in the lean burn mode, and a change rate of the engine speed Ne is faster than that in the lean burn mode. In this situation, therefore, noises and vibrations of the vehicle Ve may be increased as a result of such shifting of the operating mode. In order to avoid such disadvantages, according to the example shown in FIG. 5, the torque command Te_cmd to the engine 1 is reduced to the updated torque command Te_cmd1 that is possible to be achieved in the lean burn mode. According to the example shown in FIG. 5, therefore, the engine torque Te and the engine speed Ne will not be raised abruptly even if the operating mode of the engine 1 is shifted from the lean burn mode to the stoichiometric mode, while reducing undesirable power consumption by the first motor 2. In addition, ride comfort of the vehicle Ve can be ensured.

As also described, when the output torque of the engine 1 is restricted for some reason, the shortfall of the drive torque is generated by the second motor 3 instead of the engine 1. According to the exemplary embodiment of the present disclosure, therefore, it is possible to prevent undesirable power consumption of the first motor 2 while achieving the required drive force to accelerate the vehicle Ve.

Although the above exemplary embodiments of the present application have been described, it will be understood by those skilled in the art that the present application should not be limited to the described exemplary embodiments, and various changes and modifications can be made within the scope of the present application. For example, in a case of delivering the engine torque mechanically to the drive wheels 6, the threshold value ẞ may be set to a positive value greater than zero. Instead, the threshold value ẞ may also be set to a predetermined value in accordance with a state of charge level of the electric storage device 7 or a maximum output power of the second motor 3.

In addition, a double-pinion planetary gear unit or a Ravigneaux gear set may also be adopted as the power split mechanism 4, instead of the single-pinion planetary gear unit. Further, the routine shown in FIG. 5 may also be executed when operating the engine 1 on a reduced number of cylinders.

What is claimed is:

1. A control system for a hybrid vehicle, comprising:
an engine;
an output member that transmits torque to drive wheels;
a first motor having a generating function; and
a power split mechanism that distributes output torque of the engine to the output member and the first motor,
wherein the power split mechanism comprises an input element connected to the engine, a reaction element connected the first motor, and an output element connected to the output member,
the first motor generates a reaction torque against the output torque of the engine generated based on a required engine torque when accelerating the vehicle, so as to deliver the output torque of the engine to the drive wheels,
the control system comprising:
a controller that controls the hybrid vehicle,
wherein the controller is configured to
calculate a current maximum torque of the engine when increasing a speed of the engine to achieve an acceleration demand,
determine whether the current maximum torque of the engine is less than an inertia torque required to increase the speed of the engine, and
adjust the reaction torque of the first motor to a value equal to or less than a predetermined value, if the current maximum torque of the engine is less than the inertia torque required to increase the speed of the engine.

2. The control system for the hybrid vehicle as claimed in claim 1, wherein controller is further configured to update the output torque of the engine to the current maximum torque, and correct the inertia torque of the engine to a value possible to be generated by the current maximum torque of the engine, if the current maximum torque of the engine is less than the inertia torque required to increase the speed of the engine.

3. The control system for the hybrid vehicle as claimed in claim 1, wherein the controller is further configured to update the output torque of the engine to the current maximum torque, and adjust a change rate of the speed of the engine to a rate possible to be achieved by generating the current maximum torque of the engine, if the current maximum torque of the engine is less than the inertia torque required to increase the speed of the engine.

4. The control system for the hybrid vehicle as claimed in claim 1, wherein the controller is further configured to adjust the reaction torque of the first motor to substantially zero, if the current maximum torque of the engine is less than the inertia torque required to increase the speed of the engine.

5. The control system for the hybrid vehicle as claimed in claim 2, wherein the controller is further configured to equalize the inertia torque of the engine to the current maximum torque of the engine if the current maximum torque of the engine is less than the inertia torque required to increase the speed of the engine.

6. The control system for the hybrid vehicle as claimed in claim 1,
wherein an operating mode of the engine is selected from:
a stoichiometric mode in which an air/fuel ratio is set to a theoretical air/fuel ratio; and
a lean burn mode in which a ratio of the fuel to air is decreased compared to the stoichiometric mode, and
the controller is further configured to
calculate the current maximum torque of the engine in each of the stoichiometric mode and the lean burn mode, and
restrict the torque of the engine to the current maximum torque in the lean burn mode, if the operating mode of the engine is shifted from the lean burn mode to the stoichiometric mode.

7. The control system for the hybrid vehicle as claimed in claim 1,
wherein the engine includes a supercharger, and
the controller is further configured to calculate the current maximum torque of the engine of a case in which a speed of a turbine of the supercharger is slower than a predetermined level.

8. The control system for the hybrid vehicle as claimed in claim 1,
wherein the hybrid vehicle further comprises a second motor that is disposed between the drive wheels and the output member, and
the controller is further configured to generate a shortfall of the torque which cannot be generated by the engine by the second motor when increasing the speed of the engine to achieve the acceleration demand.

9. The control system for the hybrid vehicle as claimed in claim 1, wherein a maximum output torque of the first motor is greater than the maximum torque of the engine converted from a torque generated by the first motor.

* * * * *